UNITED STATES PATENT OFFICE.

PIERRE ROBERT, OF GARNETT, SOUTH CAROLINA, ASSIGNOR OF ONE-HALF TO JAMES C. RICHARDSON, OF ROBERTSVILLE, SOUTH CAROLINA.

ARTIFICIAL-STONE COMPOSITION.

1,172,225.

Specification of Letters Patent. Patented Feb. 15, 1916.

No Drawing. Application filed January 11, 1915. Serial No. 1,675.

*To all whom it may concern:*

Be it known that I, PIERRE ROBERT, a citizen of the United States, residing at Garnett, in the county of Hampton and State of South Carolina, have invented certain new and useful Improvements in Artificial-Stone Compositions; and I do hereby declare the following to be a full, clear, and exact description of the invention, such as will enable others skilled in the art to which it appertains to make and use the same.

My invention relates to a composition of matter intended to provide a substitute for artificial stone, cement, or the like, which may be conveniently and cheaply manufactured without the necessity for complicated and expensive plants, and which, when manufactured, may be applied to a great variety of uses.

My invention is especially intended to make use of the ordinary waste products of the pine tree as one of the principal ingredients of the composition of matter, and is intended to be carried out in regions where there are pine trees, or pine stumps, or fallen pine timber available.

In carrying out my invention, where the pine trees are standing and the pine needles are available, I provide a pan over a suitable fire, and heat therein, until thoroughly dry, a sufficient quantity of earth where it may be more conveniently obtained. For such purposes I prefer clayey subsoil, which is heated in the pan until it is thoroughly dried; when this earth has been sufficiently dried, and while still over the fire, the pine needles are stirred in continuously until the pine needles or straw is dried of all sap and shows a brown or baked color. After the pine needles have been cooked to the desired point, a sufficient quantity of crude sap from the trees is stirred in until thoroughly mixed. The product is then packed into molds and allowed to set.

Where standing pines are not available, the composition may be obtained by using stumps or down timber by finely breaking up the stumps or down timber, extracting the resinous products therefrom, and then using the wood fiber mixed in with the earth instead of the pine needles, and cooking the same to the desired point, and subsequently stirring in the liquid or semi-liquid products from the distillation of the wood in the same manner as the crude sap is stirred in, and finally molding the product as before.

The temperature to which the mixed earth and woody fiber, whether pine needles or other product, should be sufficient to thoroughly dry the fibers and yet not burn the resinous or gummy ingredients thereof, and the heat of the mixed material, when the sap or resinous liquid is added, should not be high enough to burn the same but only to dry off the excessive moisture. This temperature would vary with the conditions of dryness of the wood fiber, and the concentration of the resinous and gummy liquid added, and is readily determined by experiment. Thus less degree of heat would be required, and a shorter continuance of its application, where the products of the extracted gum from the dead wood is used instead of the crude sap from the live tree.

The proportions of the ingredients in the composition would very materially depend upon the purposes to which the composition is to be applied, and also upon the nature of the earth used, and the consistency of the sap or gummy liquid added. Thus, for instance, some earths contain much more clay than others, and some saps and woods are richer in gummy products than others, so that exact proportions cannot be laid down. Where the composition of matter is to be used in making sewer pipe, the following proportions have been found satisfactory:— one part by volume of earth, one part by volume of pine straw or pine wood fiber, and one part by volume of the extracted gum or sap, whether drawn green from the live tree or taken from the dead wood by artificial heat.

For making tile for land drainage, the following proportions have been found satisfactory:—three parts by volume of earth, three parts by volume of pine wood or pine needles, and only one part of gum or sap.

For making paving blocks or road blocks, the proportions are approximately two parts by volume of earth, two parts by volume of pine straw or wood fiber, and one part by volume of gum or sap.

The herein described composition of matter may be used for a great variety of purposes, such as building blocks, side-walks, fence posts, and for many of the uses to which cement and tiles are now applied.

It will be seen that I provide an exceedingly simple composition of matter which may be readily prepared *in situ* without the necessity for elaborate or expensive apparatus of any kind, and which is durable and efficient, and suitable for a wide variety of uses.

Having thus described my invention, what I claim and desire to secure by Letters Patent of the United States is:

1. As a composition of matter, an artificial stone composition comprising clayey earth and pine needles dried and mixed together, and crude sap thoroughly mixed with the dried mixture aforesaid, substantially as described.

2. The process of manufacturing an artificial stone composition of the character described, consisting in heating clayey earth and thoroughly drying the same, mixing into said heated earth the fibrous products of the pine tree, while the application of heat is being continued, thoroughly mixing with the above ingredients the resinous and gummy products of the pine tree, and finally molding same, substantially as described.

3. The herein described process of manufacturing an artificial stone composition which consists in heating clayey earth until dry, mixing in with this earth pine needles and continuing the application of heat until the needles are thoroughly dried, adding crude sap and driving off the excess of moisture therefrom by continuing the heat, and finally molding the product to the desired shape, substantially as described.

In testimony whereof, I affix my signature, in presence of two witnesses.

PIERRE ROBERT.

Witnesses:
J. W. CHISOLM,
W. R. LAWTON.

Copies of this patent may be obtained for five cents each, by addressing the "Commissioner of Patents, Washington, D. C."